US011676375B2

(12) United States Patent
Fuentes Ponce et al.

(10) Patent No.: US 11,676,375 B2
(45) Date of Patent: Jun. 13, 2023

(54) SYSTEM AND PROCESS FOR INTEGRATIVE COMPUTATIONAL SOIL MAPPING

(71) Applicants: Board of Trustees of the University of Arkansas, Little Rock, AR (US); The United States of America, as represented by The Secretary of Agriculture, Washington, DC (US)

(72) Inventors: Bryan Andre Fuentes Ponce, Fayetteville, AR (US); Phillip Ray Owens, Fayetteville, AR (US); Minerva Justine Dorantes, Fayetteville, AR (US)

(73) Assignees: BOARD OF TRUSTEES OF THE UNIVERSITY OF ARKANSAS, Little Rock, AR (US); THE UNITED STATES OF AMERICA, AS REPRESENTED BY THE SECRETARY OF AGRICULTURE, Washington, DC (US)

(*) Notice: Subject to any disclaimer, the term of this patent is extended or adjusted under 35 U.S.C. 154(b) by 0 days.

(21) Appl. No.: 17/461,281

(22) Filed: Aug. 30, 2021

(65) Prior Publication Data
US 2022/0067336 A1 Mar. 3, 2022

Related U.S. Application Data

(60) Provisional application No. 63/072,613, filed on Aug. 31, 2020.

(51) Int. Cl.
*G06K 9/00* (2022.01)
*G06V 20/13* (2022.01)
(Continued)

(52) U.S. Cl.
CPC ............ *G06V 20/13* (2022.01); *G06F 18/213* (2023.01); *G06F 18/23* (2023.01)

(58) Field of Classification Search
CPC .... G06V 20/13; G06K 9/6218; G06K 9/6232; G06K 9/00523
See application file for complete search history.

(56) References Cited

U.S. PATENT DOCUMENTS

| 10,830,750 B2 | 11/2020 | Owens et al. |
| 2016/0003792 A1* | 1/2016 | Owens .................. G01N 33/24 702/5 |

(Continued)

OTHER PUBLICATIONS

Ashtekar, J.M., Owens, P.R., 2013. Remembering Knowledge: An Expert Knowledge Based Approach to Digital Soil Mapping. Soil Horizons 54, 0. https://doi.org/10.2136/sh13-01-0007.
(Continued)

*Primary Examiner* — Dhaval V Patel
(74) *Attorney, Agent, or Firm* — Crowe & Dunlevy, P.C.

(57) ABSTRACT

An integrative computational soil mapping system and process that reduces the required number of soil property measurements without jeopardizing the statistical precision of the resulting digital soil maps. The integrative computational soil mapping system and process saves monetary resources and time by reducing the number of soil property measurements required to produce digital soil maps and by offering soil sample locations which capture the maximum amount of representativeness of the soil characteristics in a determined area. In addition, the inventive system and process are integrative computational soil mapping that utilize algorithms based on state-of-the-art computational statistics and machine learning methods for the production of digital soil property maps and also provides soil sampling locations to collect new soil property measurements. These soil property measurements can be used to update and
(Continued)

potentially improve previous versions of digital soil property maps, produced by the computational process.

18 Claims, 10 Drawing Sheets

(51) Int. Cl.
*G06F 18/23* (2023.01)
*G06F 18/213* (2023.01)

(56) References Cited

U.S. PATENT DOCUMENTS

| | | | |
|---|---|---|---|
| 2020/0272857 A1* | 8/2020 | Arcot Desai | G06K 9/00536 |
| 2021/0279867 A1* | 9/2021 | Silva | G06T 7/11 |
| 2022/0058505 A1* | 2/2022 | Karlinsky | G06N 7/005 |
| 2022/0129705 A1* | 4/2022 | Kim | G06V 10/762 |
| 2022/0245383 A1* | 8/2022 | Kraus | G06T 7/11 |

OTHER PUBLICATIONS

Zhu, A.X., Band, L., Vertessy, R., Dutton, B., 1997. Derivation of Soil Properties Using a Soil Land Inference Model (SoLIM). Soil Science Society of America Journal 61, 523. https://doi.org/10.2136/sssaj1997.03615995006100020022x.

Zhu, A.X., Yang, L., Li, B., Qin, C., English, E., Burt, J.E., Zhou, C., 2008. Purposive Sampling for Digital Soil Mapping for Areas with Limited Data, in: Hartemink, A.E., McBratney, A., Mendonça-Santos, M. de L. (Eds.), Digital Soil Mapping with Limited Data. Springer Netherlands, Dordrecht, pp. 233-245. https://doi.org/10.1007/978-1-4020-8592-5_20.

* cited by examiner

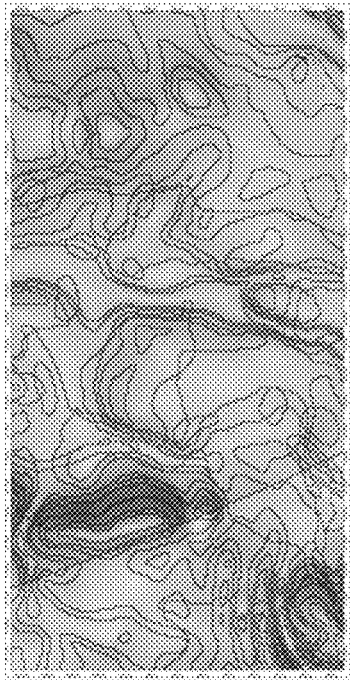
FIG. 4B
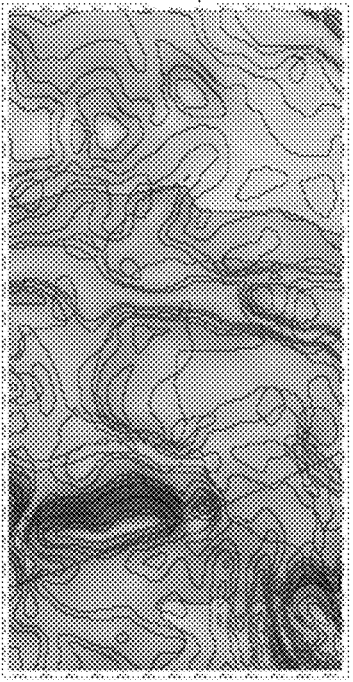
FIG. 4D
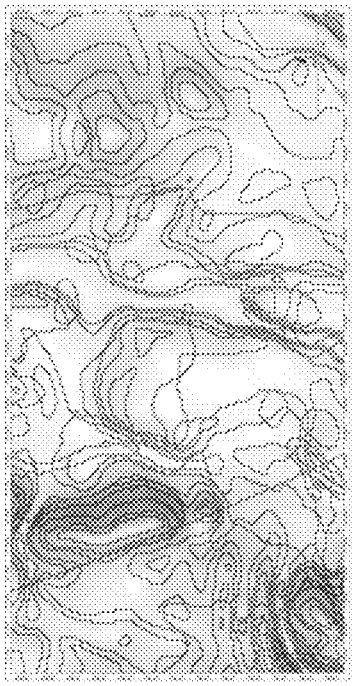
FIG. 4A
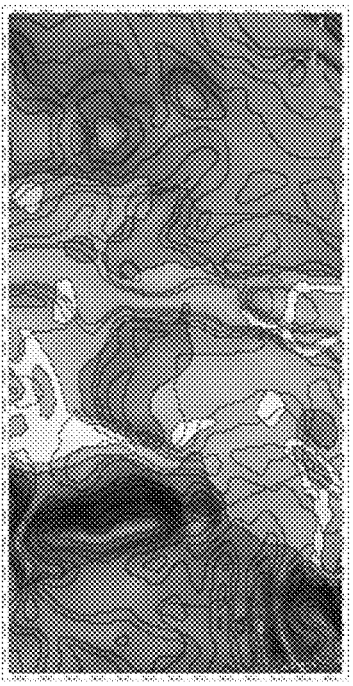
FIG. 4C
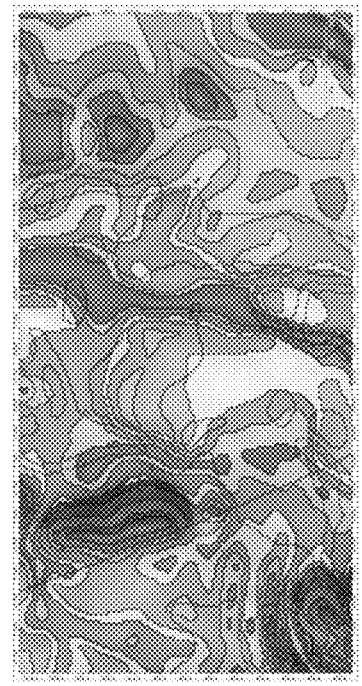
FIG. 4E

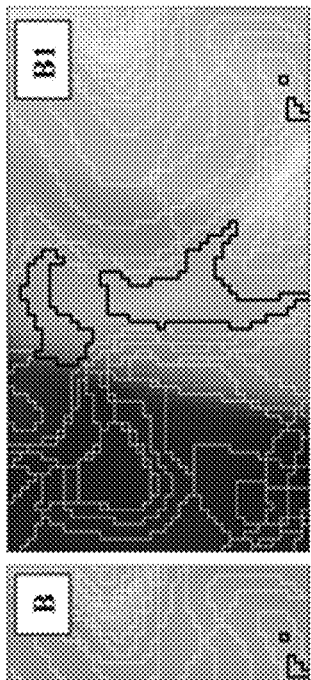
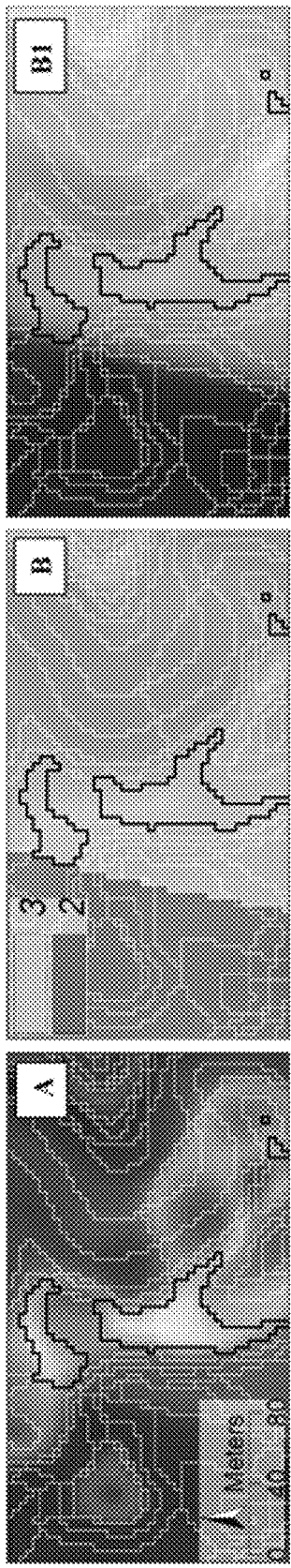
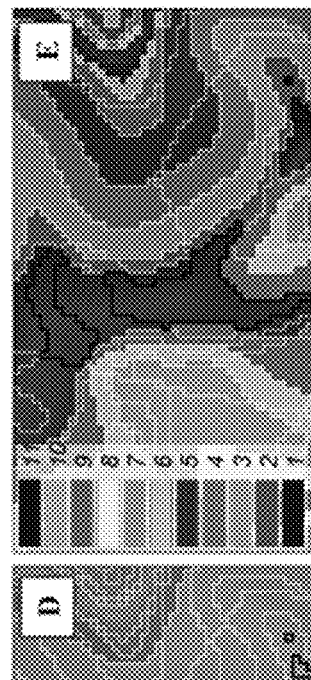
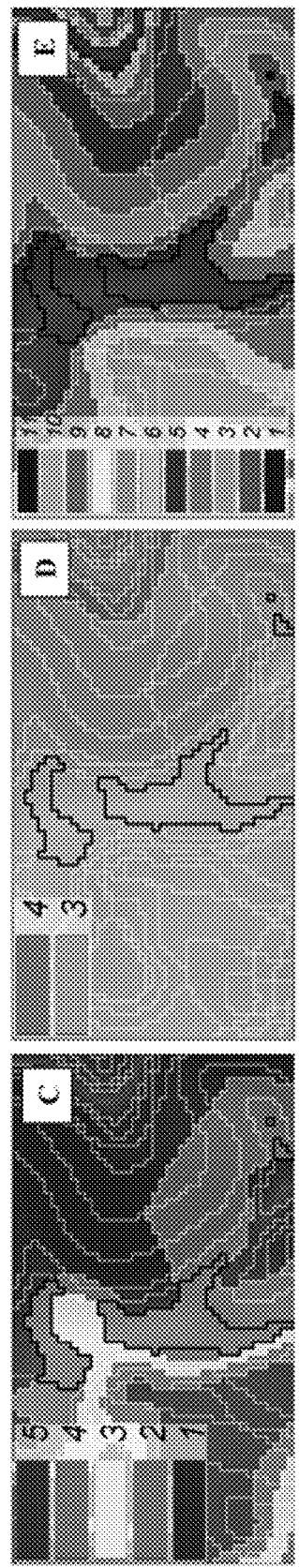
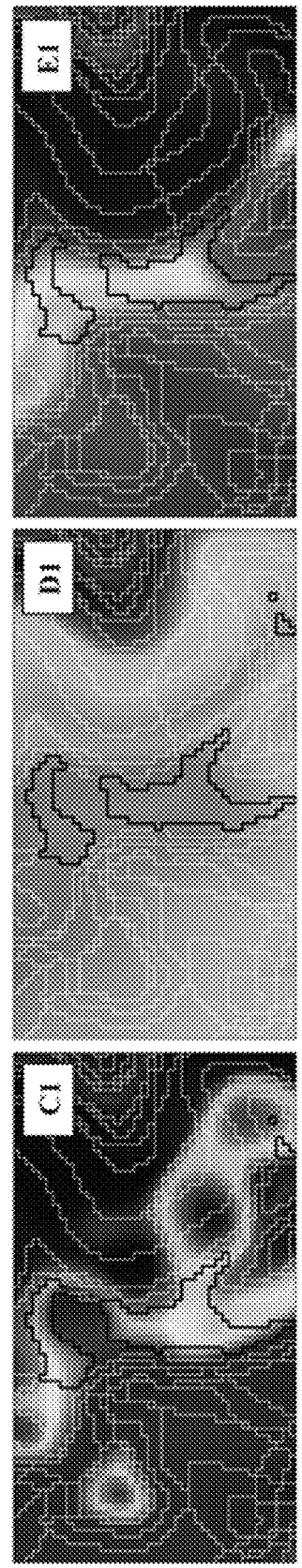
FIG. 5A  FIG. 5B  FIG. 5B1  FIG. 5C  FIG. 5D  FIG. 5D1  FIG. 5C1  FIG. 5E  FIG. 5E1

SYSTEM AND PROCESS FOR INTEGRATIVE COMPUTATIONAL SOIL MAPPING

CROSS REFERENCE TO RELATED APPLICATIONS

This application claims the benefit of U.S. Provisional Patent Application No. 63/072,613 filed on Aug. 31, 2020, and incorporates the provisional application by reference in its entirety into this document as if fully set out at this point.

BACKGROUND OF THE INVENTION

1. Field of the Invention

This invention relates generally to a system and process for integrative computational soil mapping, and more particularly to a system and process for integrative computational soil mapping to produce digital maps of soil properties, using the minimum required number of soil sample measurements, and without compromising the statistical precision of the results.

2. Description of the Related Art

For over a century, the principal means of soil resource assessment was conventional soil survey. The conventional soil surveys are hand-drawn lines drawn on paper or on an aerial photograph. The soils within a boundary are commonly grouped based off taxonomic similarity. Conventional soil survey applied the theory of soil formation and soil-landscape processes to delineate similar soils across an area based on their taxonomy. Even though soil survey maps are widespread, their usefulness for applications in land management are limited by their coarse resolution and the type of information they provide. Soil property information is not easily discernable from soil survey maps and soil property measurements are not continuous, but rather confined to specific coordinates where soil samples were collected. Moreover, the production of more detailed soil surveys is constrained by expensive fieldwork and laboratory analysis of soil samples.

With the onset of computational statistics and geographic information system technologies, continuous spatial information on the soil forming factors has become available as inputs for the spatial prediction of soils and the field of digital soil mapping emerged. The growing supply of spatial data was met by a growing demand for continuous soil property maps to be used in local land management. Over the past forty years, various methods for fitting a quantitative relationship between soil properties and soil forming factors have been developed within the digital soil mapping field. These methods include purely geostatistical approaches, statistical correlation-based approaches, and mixtures of both. Although these methods can produce precise continuous soil property maps at fine resolution, they also require vast amounts of soil sample measurements, which are not always available.

More recently, precision agriculture technologies (i.e., equipment guidance, variable rate input application, yield monitoring, and in-field sensors) and integrative environmental resource management have presented a greater demand for continuous, detailed, and precise soil property information. The aforementioned circumstances led to the development of a statistically robust and computationally efficient process for the production of digital soil maps for precision land management.

It is therefore desirable to provide an improved system and process for integrative computational soil mapping.

It is further desirable to provide a system and process for integrative computational soil mapping to produce digital maps of soil properties, using the minimum required number of soil sample measurements, and without compromising the statistical precision of the results.

It is yet further desirable to provide a system and process for integrative computational soil mapping that meets the current demand for soil information by providing a process to generate precise, fine-resolution, continuous predictions of soil properties in data-limited scenarios.

It is still yet further desirable to provide a system and process for integrative computational soil mapping that capitalizes on existing soil sample measurements and readily available data on soil forming factors in the prediction of soil properties.

Before proceeding to a detailed description of the invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

Around the world, farmers, stakeholders, policy makers and the scientific community are increasingly demanding access to up-to-date, accurate, and precise spatial soil information. This information is critical to answer questions related to crop management, precision agriculture activities, and soil management impact on food security and environmental health. In order to produce accurate spatial soil information in the form of digital soil maps, the availability of soil samples with good coverage of the area(s) of interest is mandatory. The activities of soil sampling and soil property measurements by laboratory analysis are restricted by budget, time, and human effort constraints. The production of digital soil maps is a resource-demanding activity, which often results in unsatisfactory products if an insufficient number of soil samples with property measurements is available.

In order address the shortcomings of current digital soil maps, provided herein is an integrative computational soil mapping system and process that reduces the required number of soil property measurements without jeopardizing the statistical precision of the resulting digital soil maps. The integrative computational soil mapping system and process saves monetary resources and time by reducing the number of soil property measurements required to produce digital soil maps and by offering soil sample locations which capture the maximum amount of representativeness of the soil characteristics in a determined area. In addition, the inventive system and process are integrative computational soil mapping that utilize algorithms based on state-of-the-art computational statistics and machine learning methods for the production of digital soil property maps and also provides soil sampling locations to collect new soil property measurements. These soil property measurements can be used to update and potentially improve previous versions of digital soil property maps, produced by the computational process.

The produced digital soil maps can be incorporated in precision agriculture routines like equipment guidance routines, the delineation of management zones, the variable rate application of fertilizers, carbon storage potential, and irrigation plans. The incorporation of digital soil maps into these routines can improve the expected crop-related outcomes by providing precise information of the soil characteristics in a farm. Moreover, the produced digital soil maps can support integrative environmental resource management and sustainable ecosystem management by providing precise soil property estimates across space, which can be used to identify focal points for soil amendments and soil health concerns.

The inventive system includes and the inventive process utilizes a computer having a processor and a memory, and a software module stored in the memory, comprising executable instructions that when executed by the processor cause the processor to perform the integrated computation soil mapping process. The process includes: receiving electronic data representing soil information for an area of interest; automatically or semi-automatically generating environmental layers using spatial analysis related to a cluster category; automatically or semi-automatically performing cluster analysis for each cluster category; automatically or semi-automatically generating generic soil-landscape classes from spatial interactions of clustering groups across the cluster categories; assigning at least one soil property measurement to each generic soil-landscape class; generating a digital soil map of the soil property measurement for the area of interest; and outputting the digital soil map to an electronic display for a user.

The process can further include grouping the environmental layers according to the cluster category; selecting the environmental layers that capture a predetermined amount of variability in environmental conditions of the area of interest; automatically or semi-automatically performing data dimensionality reduction; automatically or semi-automatically recognizing patterns of interaction between the selected environmental layers using cluster analysis; automatically or semi-automatically performing selection of optimum number of clustering groups; automatically predicting and mapping a statistical distribution of the selected environmental layers for each clustering group using predictive statistical regression; automatically generating a group-likelihood map that represents a likelihood of occurrence for each clustering group across the area of interest; automatically generating a generic soil-landscape class map using the generic soil-landscape class for each clustering group; automatically generating a single class-likelihood map representing the likelihood of occurrence for the generic soil-landscape class across the area of interest; assigning a soil sample location on the class-likelihood map for each generic soil-landscape class where an utmost likelihood of occurrence for the generic soil-landscape class across the area of interest exists; assigning the soil property measurement for each soil sample location on the class-likelihood map to each generic soil-landscape class; automatically performing spatial modeling of the soil property measurements; generating the digital soil map of the modeled soil property measurements; and outputting the digital soil map to the electronic display for the user.

The cluster category can be climate, vegetation, topography, parent material, or a combination thereof, and the environmental layers can be annual precipitation, mean annual temperature, elevation of the terrain, slope of the terrain, photosynthetic activity of vegetation, or a combination thereof. In addition, the soil property measurement property can include soil property measurements collected from the area of interest using the soil sample location or a user-supplied set of soil property measurements.

The cluster analysis may determine naturally occurring clustering groups in the environmental layers for each cluster category. The statistical distribution of the selected environmental layers for each clustering group can be calculated using a kernel density estimate and empirical distribution function, and the group-likelihood maps can be averaged for each generic soil-landscape class. Additionally, the soil sample location can include X-easting and Y-northing geographic coordinates.

The process step of automatically performing spatial modeling of the soil property measurements can further include organizing each class-likelihood map into a stack of matrices; for each element position in the stack of matrices, identifying two elements with the utmost likelihood of occurrence for the generic soil-landscape classes across the area of interest; identifying the corresponding generic soil-landscape classes for the two elements with the utmost likelihood of occurrence; identifying the corresponding soil property measurements for the two identified generic soil-landscape classes; and calculate a weighted average of the identified soil property measurements using the utmost likelihood of occurrence of the generic soil-landscape classes as the assigned weight.

The foregoing has outlined in broad terms some of the more important features of the invention disclosed herein so that the detailed description that follows may be more clearly understood, and so that the contribution of the named inventors to the art may be better appreciated. The invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings. The patent or application file contains at least one drawing executed in color. Copies of this patent or patent application publication with color drawing(s) will be provided by the Office upon request and payment of the necessary fee.

FIG. 4A through FIG. 4E are examples of spatial subsets of a digital soil map of generic soil-landscape classes over shaded terrain (FIG. 4A). The black polygons represent the boundaries of generic soil-landscape classes. FIGS. 4B, 4C, 4D and 4E show the generic soil-landscape classes boundaries over the climatic cluster (FIG. 4B), vegetation cluster (FIG. 4C), global topographic cluster (FIG. 4D), and local topographic cluster (FIG. 4E) categories, respectively, in accordance with an illustrative embodiment of the invention disclosed herein.

FIG. 5A through FIG. 5E1 illustrate generic soil-landscape class 320301 outlined by the black polygons in each of the subsets. The class 320301 resulted from the intersection of the clustering groups 3, 2, 3 and 1 from the climatic (FIG. 5B), vegetation (FIG. 5C), global topographic (FIG. 5D) and local topographic (FIG. 5E) cluster categories, respectively. FIGS. 5B1, 5C1, 5D1 and 5E1 show the group-likelihood maps for the clustering groups previously mentioned. FIG. 5A shows the class-likelihood map for the generic soil-landscape class 320301. The class-likelihood map resulted from averaging the group-likelihood maps shown in FIGS. 5B1, 5C1, 5D1 and 5E1. White polygons in the subsets represent the boundaries between other generic soil-landscape classes.

DETAILED DESCRIPTION OF THE INVENTION

Figure 1:
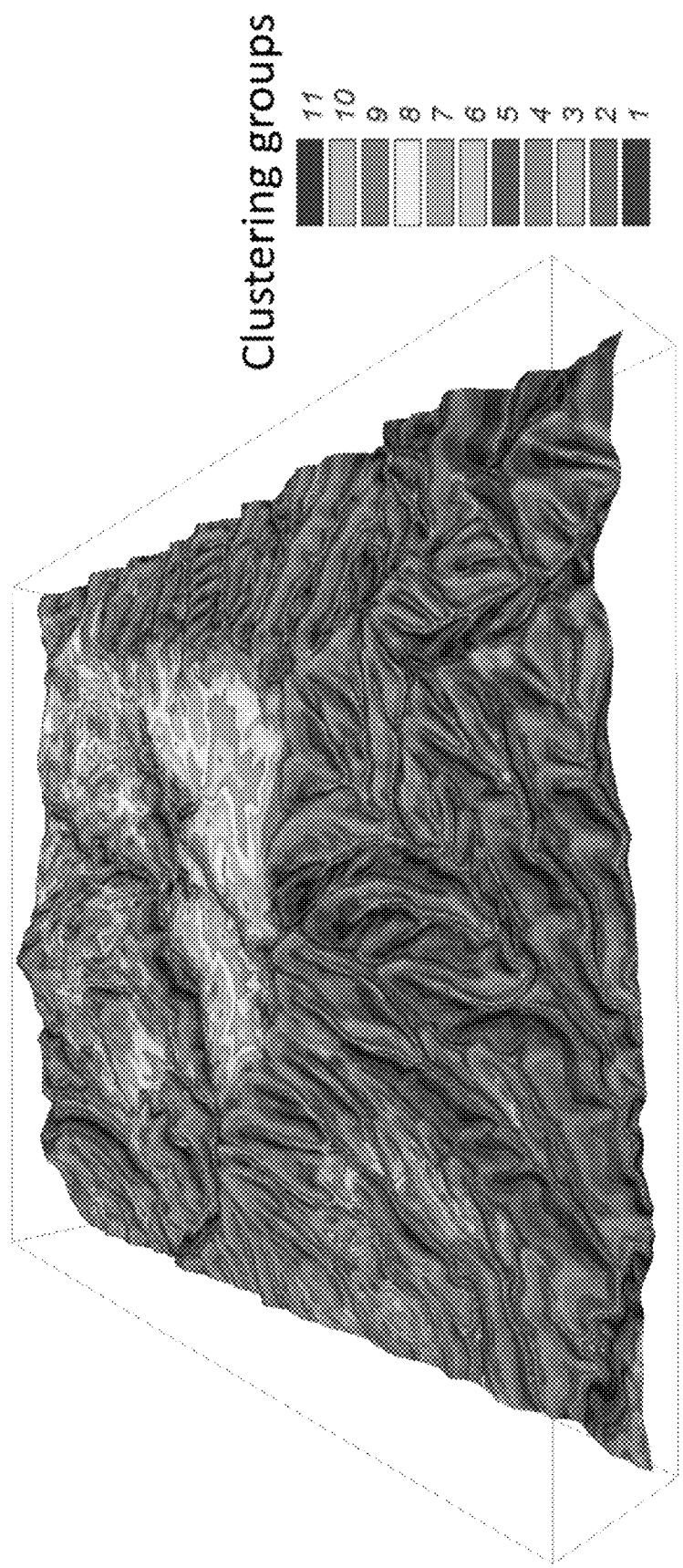
FIG. 1 is a digital soil map illustrating an example of clustering groups for a topographic cluster category in accordance with an illustrative embodiment of the invention disclosed herein.

While this invention is susceptible of embodiment in many different forms, there is shown in the drawings, and will herein be described hereinafter in detail, some specific embodiments of the invention. It should be understood, however, that the present disclosure is to be considered an exemplification of the principles of the invention and is not intended to limit the invention to the specific embodiments so described.

A system and process for integrative computational soil mapping are provided herein and provide a statistically robust and computationally efficient system and process to produce digital soil maps for precision land management. More particularly, the integrative computational soil mapping system and process produce digital maps of soil properties using a minimal number of soil sample measurements and without compromising the statistical precision of the resulting digital soil maps. The system and process generate precise, fine-resolution, continuous predictions of soil properties in data-limited scenarios.

The inventive system and process for integrative computational soil mapping allows the user to generate maps of soil properties in a semi-automated fashion and by using a minimum amount of soil sample measurements. The information produced through the integrative computational soil mapping process provides an accurate visual and numerical representation of the spatial variability of any soil property for which there is associated soil sample measurements. The integrative computational soil mapping process performs numerical computation and spatial modeling using algorithms based on state-of-the-art machine learning and computational statistics techniques. The algorithms composing this integrative computational soil mapping process automatically find patterns in the soil forming factors, which are subsequently used as inputs to predict the spatial variability of soil properties. Moreover, the algorithms leverage modern computational resources and/or architectures, like distributed computing environments. The integrative computational process produces soil property maps for large areas using a minimum number of soil sample measurements, and that the statistical precision of the resulting maps is not compromised. The use of machine learning and computational statistics algorithms allows for the precise modeling of soil properties under the computational process. In addition, by-products of the process can be used for the optimization of soil sampling routines. Specifically, the computational process produces a set of spatial locations in the form of XY coordinates where soil samples should be taken, or selected from, to maximize the magnitude of representativeness of the environmental conditions for an area. These characteristics allow the computational process to reap the most benefit from limited soil measurements, and to produce statistically precise soil property maps. Limited soil measurements are a common scenario due to the high cost associated with fieldwork and soil laboratory analysis as well as inaccessibility to field sites. Thus, this process is a cost-and time-effective solution to the demand for accurate information at the local or farm level.

The integrative computational soil mapping system and process generate maps of soil properties in a semi-automated or fully automated manner using a minimum amount of soil sample measurements. The digital soil maps produced through the system and process provide an accurate visual and numerical representation of the spatial variability of any soil property for which there is an associated soil sample measurement. Examples of soil properties include but are not limited to percent sand, percent silt, percent clay, percent organic matter, pH, nutrients, or a combination thereof. The inventive system and process perform numerical computational and spatial modeling using algorithms using machine learning and computational statistics methods. The algorithms of the integrative computational soil mapping system and process automatically find patterns in the soil forming factors, which are subsequently grouped to establish unique spatial entities between which soil properties vary. In addition, the unique spatial entities can be used for the optimization of soil sampling routines. The integrative computational soil mapping system and process produce a set of spatial locations in the form of X-Y coordinates, where soil samples should be taken to maximize the magnitude of representativeness of the environmental conditions for a selected area. In addition, the unique spatial entities can be used to discriminate among pre-existing soil samples, those which would be most useful for the creation of digital soil property maps.

As discussed in the Background, limited soil measurements are a common scenario due to the high cost associated with fieldwork and soil laboratory analysis as well as inaccessibility to field sites. In the field of digital soil mapping, the direct relationship between the complexity/robustness of the modeling techniques and the number of soil samples required to get a statistically precise modeling of soil properties is a continual issue. The number of soil samples must be large enough to be characteristic of the environmental conditions in the area of interest; however, when precise digital soil maps are required for large areas, often with complex topography and different vegetative cover, the number of soil samples can easily become too large to be feasible due to budget, time, and human effort constraints.

Based on this continuing need in the field of digital soil mapping, the integrative computational soil mapping system and process provided herein is a cost- and time-effective solution to the demand for accurate information at the local or farm level. The inventive system and process support precision agriculture technologies and techniques by integrating the generated digital soil property maps into equipment guidance routines, the delineation of agricultural management zones, the variable rate application of fertilizers, and irrigation plans. Additionally, the inventive system and process support integrative environmental resource management and sustainable ecosystem management by providing precise soil property estimates across space, which can be used to identify focal points for soil amendments and soil health concerns.

The integrative computational soil mapping system and process initially generates a set of digital environmental layers through matrix-based spatial analysis related to particular soil forming categories (e.g., climate, vegetation, topography, parent material or a combination thereof) for a particular area of interest. Some examples of the environmental layers include but are not limited to annual precipitation, mean annual temperature, elevation of the terrain, slope of the terrain, photosynthetic activity of vegetation, or a combination thereof. The environmental layers may be generated in a semi-automated or fully automated manner. For fully automating the environmental layers generation process, the integrative computational soil mapping system and process only requires a polygon input, such as in a GIS readable format. With the polygon input, the system and method autonomously search web-based geospatial databases to retrieve environmental layers related to climate, multispectral vegetation indices, and geologic/geomorphologic digital layers.

The environmental layers are then grouped according to the soil forming category, hereinafter referred to as cluster category, and the integrative computational soil mapping system and process then performs principal component analysis coupled with component rotation to select from each cluster category, those environmental layers that capture the greatest amount of variability in the environmental conditions of the area of interest. Those environmental layers that do not account for a significant amount of variability may be discarded.

For each defined cluster category, the inventive system and process performs a data dimensionality reduction routine. The data dimensionality reduction routine can be electronically conducted in a semi-automated or fully automated manner. The data dimensionality reduction routine is based on the Self Organizing Map (SOM) technique. The SOM is a technique from the artificial intelligence field, which automatically finds a set of reference observations from the environmental layers and assigns each of the remaining observations to one and only one reference observation. The assignment of an observation to its reference is based on the average similarity between their environmental layer values.

For each defined cluster category, the inventive system and process performs cluster analysis of the environmental layers using the reference observations obtained by the SOM technique. The cluster analysis can be electronically conducted in a semi-automated or fully automated manner. The cluster analysis algorithm represents a data-partitioning procedure, which finds naturally occurring clustering groups in the set of environmental layers for each defined cluster category. The clustering groups are found by randomly selecting a defined number of reference observations from the environmental layers. These randomly selected reference observations are considered as group prototypes. Then, each reference observation is assigned to the most similar group prototype. Group prototypes are then iteratively reassigned based on the pairwise similarity of the reference observations within each group. The final group prototypes will be those reference observations that, on average, are the most similar to the rest of reference observations within each group. Once the best set of group prototypes are found, the cluster analysis stops, and the final clustering groups are obtained. The pairwise similitude between reference observations is calculated with the following formula:

$$d(i,j) = \sqrt{(i_1-j_1)_2 + (i_2-j_2)_2 + (i_3-j_3)_2 + \ldots + (i_n-j_n)^2} = \sqrt{\Sigma_{i=1}^{n}(i-j)^2} \quad \text{(Equation 1)}$$

Where d is the similarity measurement between two reference observations (i,j). The subscripts (1,2,3+ . . . +n) indicate each of the environmental layers for a defined cluster category. FIG. 1 shows an example of clustering groups for a topographic cluster category.

For each defined cluster category, the inventive system and process can detect the optimum number of clustering groups. The detection of the optimum number of clustering groups can be electronically conducted in a semi-automated or fully automated manner. The detection of the optimum number of clustering groups is based on the total within-cluster sum of squares metric:

$$\Sigma_{k=1}^{K} \Sigma_{i=1}^{n_k} z_{ik}(x_i - \bar{x}_k)^2 \quad \text{(Equation 2)}$$

Where $(x_i - \bar{x}_k)^2$ represents the square difference between a reference observation $x_i$ and the clustering group prototype $\bar{x}_k$. $z_{ik}$ indicates that only reference observations belonging to the clustering group k are allowed for the square difference calculation within the clustering group k. This squared difference is then summed across clustering groups to get the total within-cluster sum of squares metric. The inventive system and process automatically decides what number of clustering groups is the optimum by testing multiple numbers of clustering groups, and then, by comparing their total within-cluster sum of squares of the real reference observations, to that from a computationally simulated and clustered set of random reference observations (with identical statistical distribution to that of the real reference observations). The inventive system and process determines the optimum number of clustering groups as the number of groups which results in the largest difference between the total within-cluster sum of squares of real reference observations and the total within-cluster sum of squares of the simulated reference observations.

For each clustering group, the inventive system and process automatically finds the underlying statistical distribution of each environmental layer. To obtain the underlying statistical distribution of an environmental layer, the inventive system and process utilizes the histogram of that environmental layer and applies the kernel density estimate and the empirical distribution function. For an environmental layer and a clustering group, the histogram is built from observations of the environmental layer enclosed by that clustering group. Using the central observations of the histogram's bins, the kernel density estimate, and the empirical distribution function are calculated separately, using the following equations:

$$\hat{f}(x;h) = \frac{1}{n}\sum_{i=1}^{n}\frac{1}{\sqrt{2\pi h}}e^{-(x-X_i)^2/2h}; \text{ for kernel density estimate} \quad \text{(Equation 3)}$$

-continued $$\hat{F}_n(X) = \frac{1}{n}\sum_{i=1}^{n} I(X_i \le x); \text{ for empirical distribution function} \quad \text{(Equation 4)}$$

Where h is the bandwidth parameter of the kernel density estimate, I is the indicator function for the empirical distribution function, x represents an observation, and $X_i$ represents the central observation of a histogram's bin.

Figures 2A, 2B, 2C, 2D:
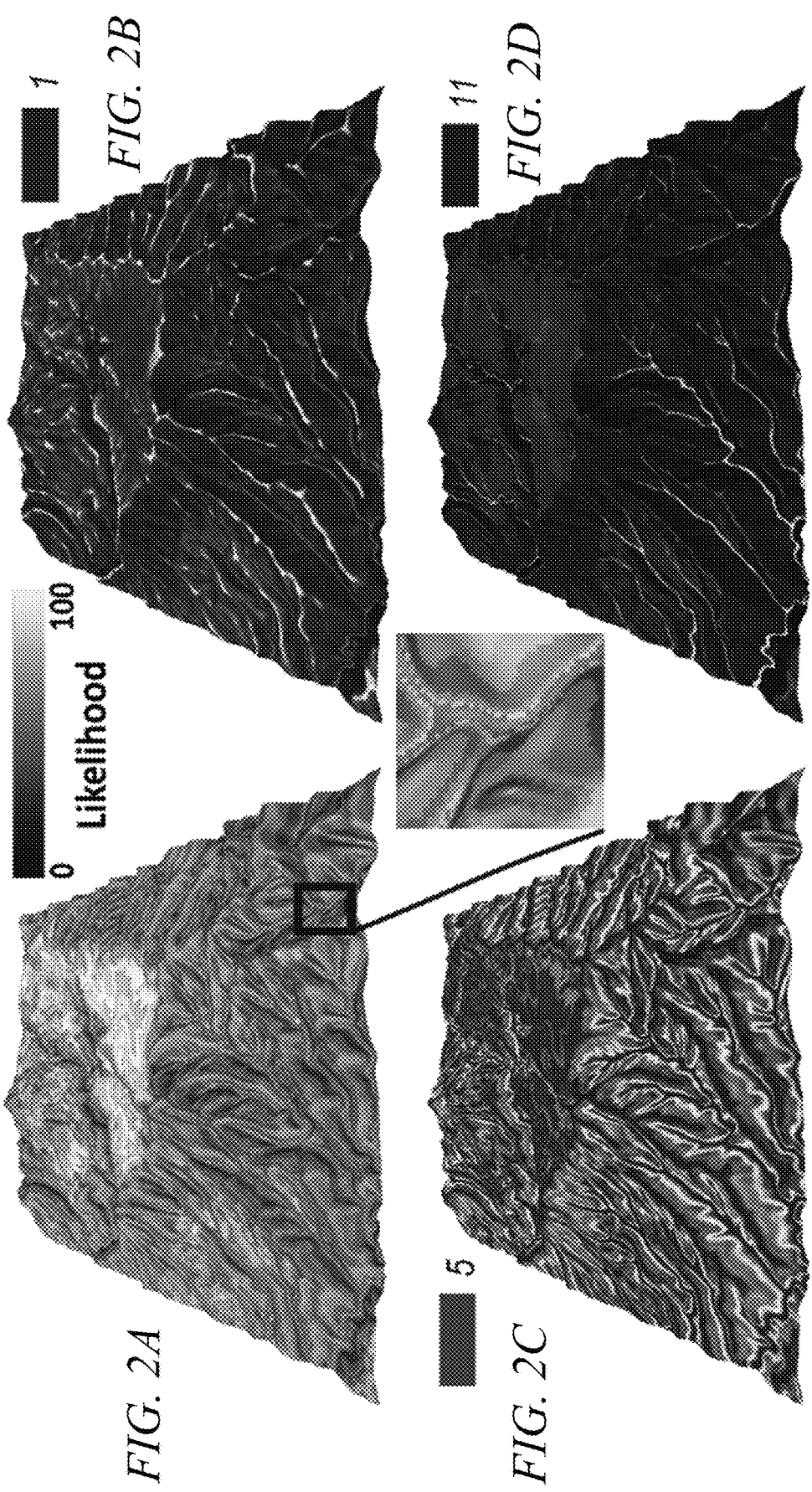
FIGS. 2A through 2D are digital soil map illustrating an example of a topographic cluster category (FIG. 2A) with group-likelihood maps for clustering groups 1 (FIG. 2B), 5 (FIG. 2C), and 11 (FIG. 2D) of FIG. 1 in accordance with an illustrative embodiment of the invention disclosed herein.

For each environmental layer, the inventive system and process automatically predicts and maps the underlying statistical distribution across the spatial extent of that environmental layer. To predict and map the underlying statistical distribution, as expressed by the kernel density estimate and the empirical distribution function, the inventive system and process applies a nonparametric regression based on locally weighted polynomials, using the environmental layer observations as predictor values. The locally weighted polynomials are constructed following the locally estimated scatterplot smoothing (LOESS) technique. Once the underlying statistical distribution has been predicted for each environmental layer, the integrative computational system and process automatically generates a final, clustering group-likelihood map that represents the likelihood of occurrence for a clustering group across the area of interest. FIG. 2A shows an example of a topographic cluster category with the corresponding group-likelihood maps for clustering groups 1 (FIG. 2A), 5 (FIG. 2B), and 11 (FIG. 2C).

Figure 3:
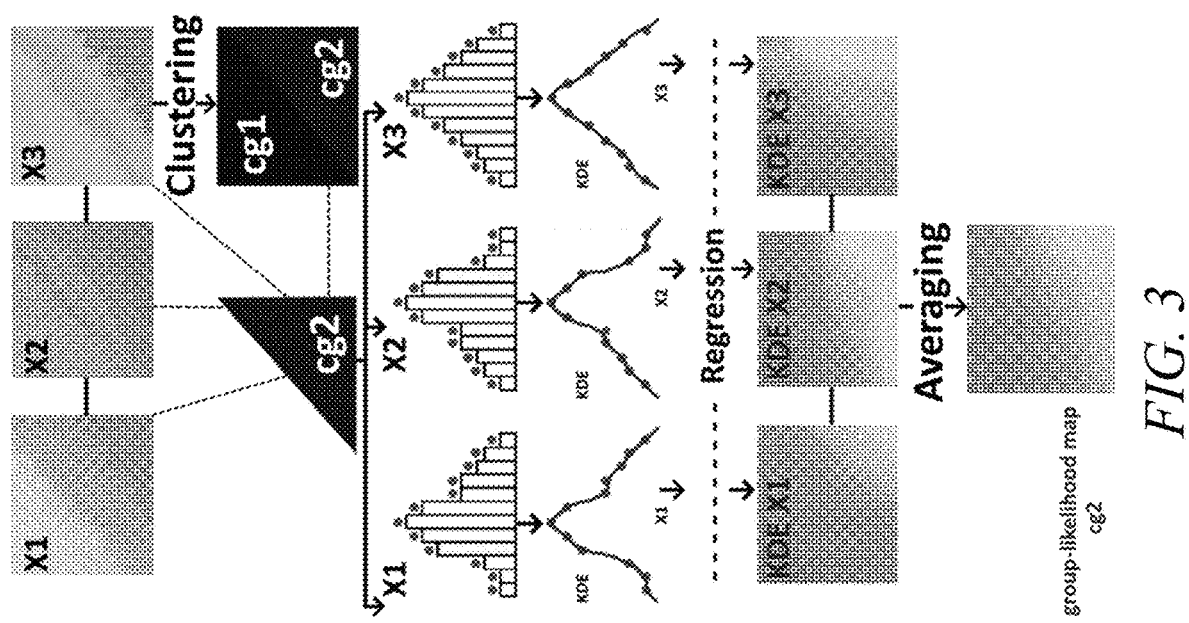
FIG. 3 illustrates steps to produce a group-likelihood map in accordance with an illustrative embodiment of the invention disclosed herein.

In accordance with an illustrative embodiment of the integrative computational soil mapping system and process, the steps to generate a group-likelihood map are exemplified in FIG. 3. As shown in FIG. 3, X1, X2, and X3 represent three environmental layers of a certain cluster category (e.g. topography), and cg1 and cg2 represent two clustering groups and are the result of clustering X1, X2, and X3. For X1, X2, and X3, a histogram is built using only observations that were assigned to cg2. The kernel density estimate (KDE) is applied to the histogram bins' central observations, which results in a probability density function of the underlying statistical distribution of X1, X2, and X3. The KDE is predicted in the entire area of interest covered by the environmental layers through the nonparametric regression based on locally weighted polynomials. The environmental layer value acts as the predictor for its corresponding KDE. The resulting KDE predictions for X1, X2, and X3 are averaged and the group-likelihood map is generated by the system and process. The process is repeated for each clustering group and for each cluster category.

The clustering groups are spatially intersected across cluster categories. The resulting intersection represents a generic soil-landscape class map, which is composed of several spatial entities that can be formed by one or more units (i.e. polygons). These spatial entities, hereinafter referred to as generic soil-landscape classes, represent a distinctive interaction between the environmental layers. A distinct interaction of environmental layers will affect the behavior of soil properties in a distinctive manner. Specifically, the spatial variability of a soil property will be lower within a generic soil-landscape class in comparison to that spatial variability between generic soil-landscape classes (intra-group homogeneity vs. inter-group heterogeneity). FIG. 4 shows an example of a generic soil-landscape class map and corresponding clustering groups for each cluster category, and more particular, FIG. 4 shows a spatial subset of a generic soil-landscape class map over shaded terrain (FIG. 4A) with the black polygons representing the boundaries of the generic soil-landscape classes. FIGS. 4B, 4C, 4D and 4E show the generic soil-landscape class boundaries over the climatic cluster, vegetation cluster, global topographic cluster, and local topographic cluster categories, respectively.

Each generic soil-landscape class is assigned a unique code. Then, for each generic soil-landscape class, the corresponding group-likelihood maps (one for each clustering group composing the generic soil-landscape class) are averaged, and a single class-likelihood map is automatically generated that represents the likelihood of occurrence for a generic soil-landscape class across the area of interest. FIG. 5 shows an example of a class-likelihood map and the corresponding clustering groups for each cluster category, and more particularly illustrates generic soil-landscape class 320301 outlined by the black polygons in each of the subsets. The class 320301 resulted from the intersection of the clustering groups 3, 2, 3 and 1 of FIG. 1 from the climatic (FIG. 5B), vegetation (FIG. 5C), global topographic (FIG. 5D) and local topographic (FIG. 5E) cluster categories, respectively. FIGS. 5B1, 5C1, 5D1 and 5E1 show the group-likelihood maps for the clustering categories.

For each generic soil-landscape class, the inventive system and process uses the corresponding class-likelihood map to identify the spatial location where the highest likelihood value occurs (values typically between 0 and 100). A soil sample is pinned in the spatial location (X-easting and Y-northing geographic coordinates) with the highest likelihood value. This process is iterated until all the generic soil-landscape classes are assigned one soil sample. For a generic soil-landscape class, the spatial location where the highest likelihood value occurs is considered as the location where the soil property measurements best represent the characteristics of the soil enclosed by that class.

The integrative computational system and process then generates a set of soil sampling locations (e.g., one per each generic soil-landscape class) in a readable format by GPS (global positioning systems) or GIS (geographic information systems). Each sampling location is electronically appended the following attributes (e.g., in columns in a spreadsheet): (1) a unique identifier, (2) a unique code of the corresponding generic soil-landscape class, (3) the X coordinate (easting), and (4) the Y coordinate (northing). The X and Y coordinates indicate to a human user the spatial location where the soil sample should be taken. Once the soil property measurements are obtained from the soil samples by the user (mostly by laboratory methods), the soil property measurements are appended to the initial attributes of each soil sampling location. This new set of soil sample locations, with soil property measurements appended to each location, is digitally read by the integrative computational process and system, and a soil property measurement is assigned to each generic soil-landscape class.

In the situation where soil property measurements are readily available for the area of interest, and assuming that the measurements have attributes of X and Y coordinates, the user can convert these measurements into a GIS-readable format (i.e. a vector file of point geometry). The integrative computational system and process then electronically reads the user-defined soil property measurements and subsequently assigns one measurement to each generic soil-landscape class. For a generic soil-landscape class and for each soil property, the soil property measurement may be assigned based on the following criteria: (1) the soil property measurement has to be spatially located within the area enclosed by the generic soil-landscape class, and (2) if two or more soil samples are enclosed by the class, the measurement of the sample point closest to the spatial location with the highest likelihood value for the class is selected.

Once a soil property measurement is assigned to each generic soil-landscape class, and regardless of the origin of the measurements (collected from the field using the provided set of sampling locations, or a user-supplied set of measurements), the inventive system and process then automatically performs spatial modeling of the soil properties. For a soil property, the spatial modeling process can be performed as follows: (1) all the class-likelihood maps are organized into a stack of matrices, (2) for each element position in the stack of matrices, the two elements with the highest likelihood values are identified, (3) the corresponding generic soil-landscape classes for the two elements are identified, (4) the corresponding soil property measurements for the two previously identified generic soil-landscape classes are also identified, (5) a weighted average function is applied by using the previously identified soil property measurements as the quantities to average, and by using the corresponding likelihood values of the generic soil-landscape classes as weighting quantities. This process is iterated for all the element positions in the stack of matrices.

The integrative computational system and method can optionally perform a statistical validation of the digital soil map. The integrative computational system and method electronically reads a user-supplied set of independent soil sample measurements and statistical metrics of model performance can be calculated. The root-mean-square error (RMSE), the mean absolute error (MAE), and the r-squared ($r^2$) are electronically calculated by comparing the measured soil property at location X-Y with the modeled soil property by the integrative computational process at the same location. The following equations are used:

$$\sqrt{1/n \Sigma_{i=1}^{n}(\hat{y}_i - y_i)^2} \text{ for RMSE} \quad \text{(Equation 5)}$$

$$1/n \Sigma_{i=1}^{n}|\hat{y} - y| \text{ for } MAE \quad \text{(Equation 6)}$$

$$\Sigma_{i=1}^{1} = (y_i - \hat{y}_i)^2 / \Sigma_{i=1}^{n}(y_i - \bar{y}_i)^2 \text{ for } r^2 \quad \text{(Equation 7)}$$

Where $y_i$ is the measured soil property value, $\hat{y}_i$ is the modeled soil property value, and $\bar{y}_i$ is the average soil property value.

The integrative computational soil mapping system and method employs an effective stratification routine, which considers the intrinsic differences in environmental layers according to the soil forming factor which they account for. More specifically, the stratification routine follows a grouped approach in which environmental layers are first categorized based on their soil forming factor category, and then cluster analysis is performed separately for each category. The final sampling stratification units, referred to as the generic soil-landscape classes herein, are obtained by the spatial intersection of the resulting clustering groups across the cluster categories. A generic soil-landscape class represents a spatial entity enclosing a distinctive soil body. Only one soil sample is therefore required to represent the nature and properties of the enclosed soil body. As a result, the number of soil samples required to produce a digital soil map, depends only on the number of generic soil-landscape units present in the area of interest.

Figure 6A:
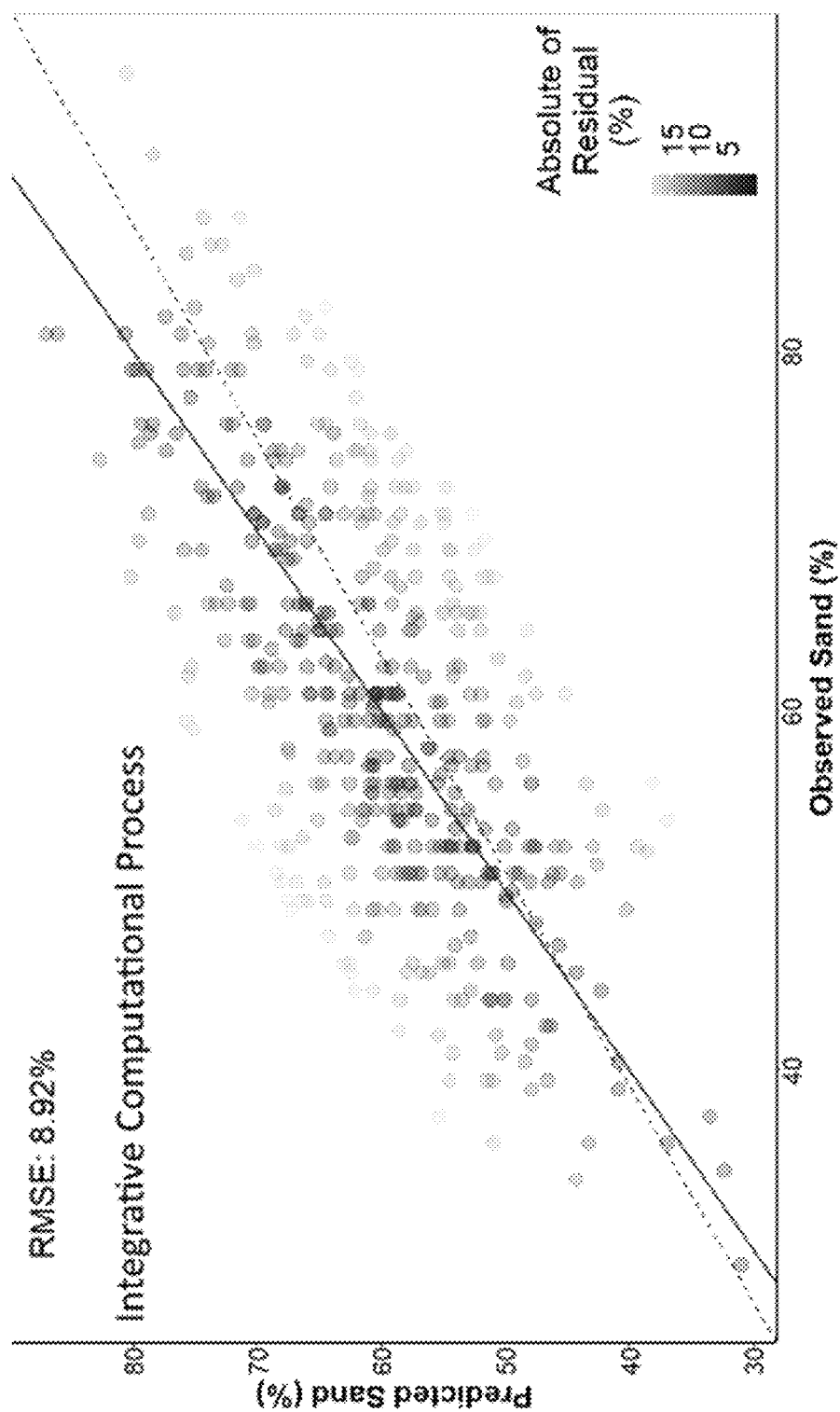
FIGS. 6A through 6D show the statistical precision of a digital soil map of percent sand produced generated using the integrative computational system process (FIG. 6A) as compared to the precision generated in FIGS. 6B through 6D by three well-known predictive modeling techniques in the digital soil mapping domain, namely generalized linear model (GLM) (FIG. 6B), generalized additive model (GAM) (FIG. 6C), and random forests regression (RF) (FIG. 6D).
Figure 6B:
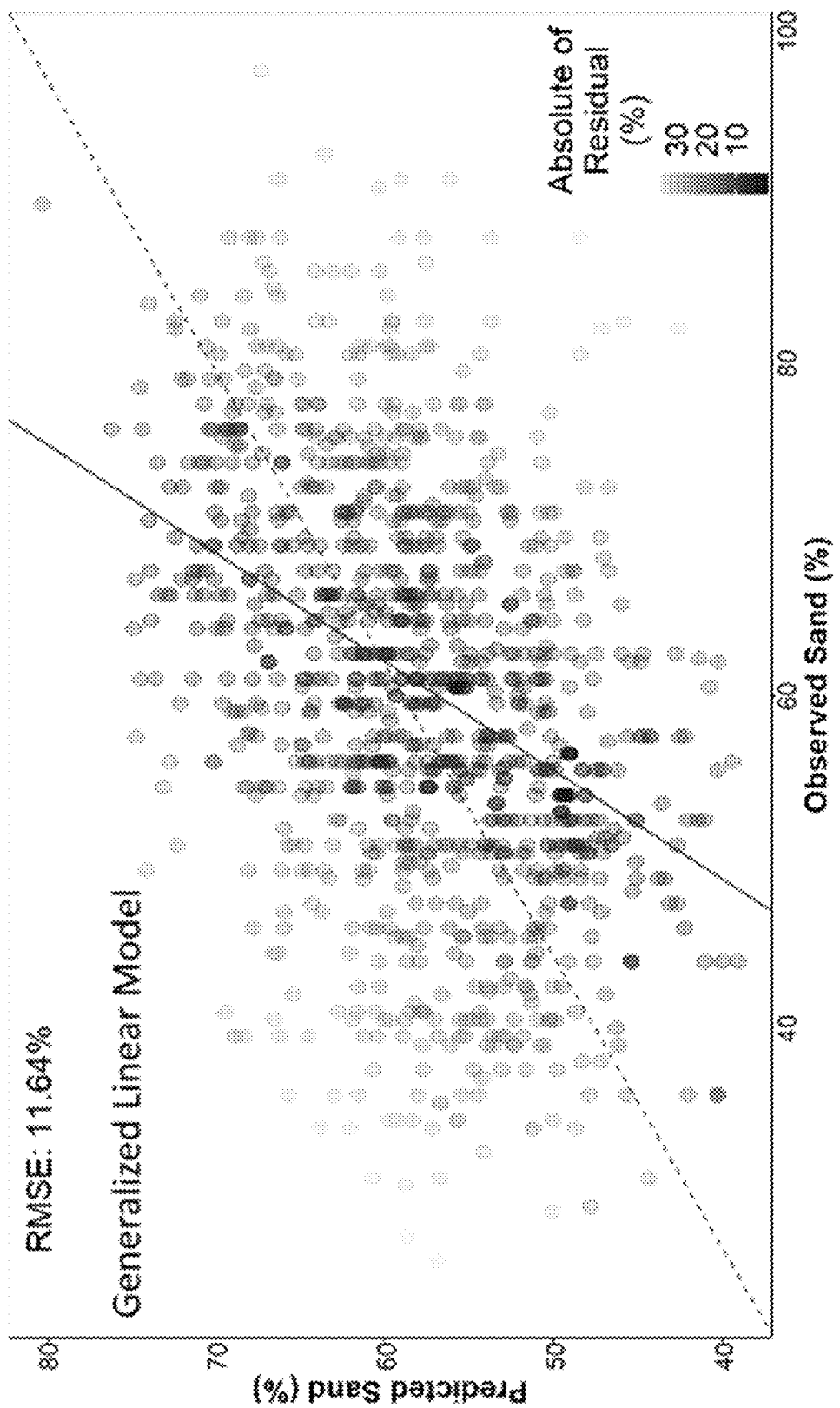
Figure 6C:
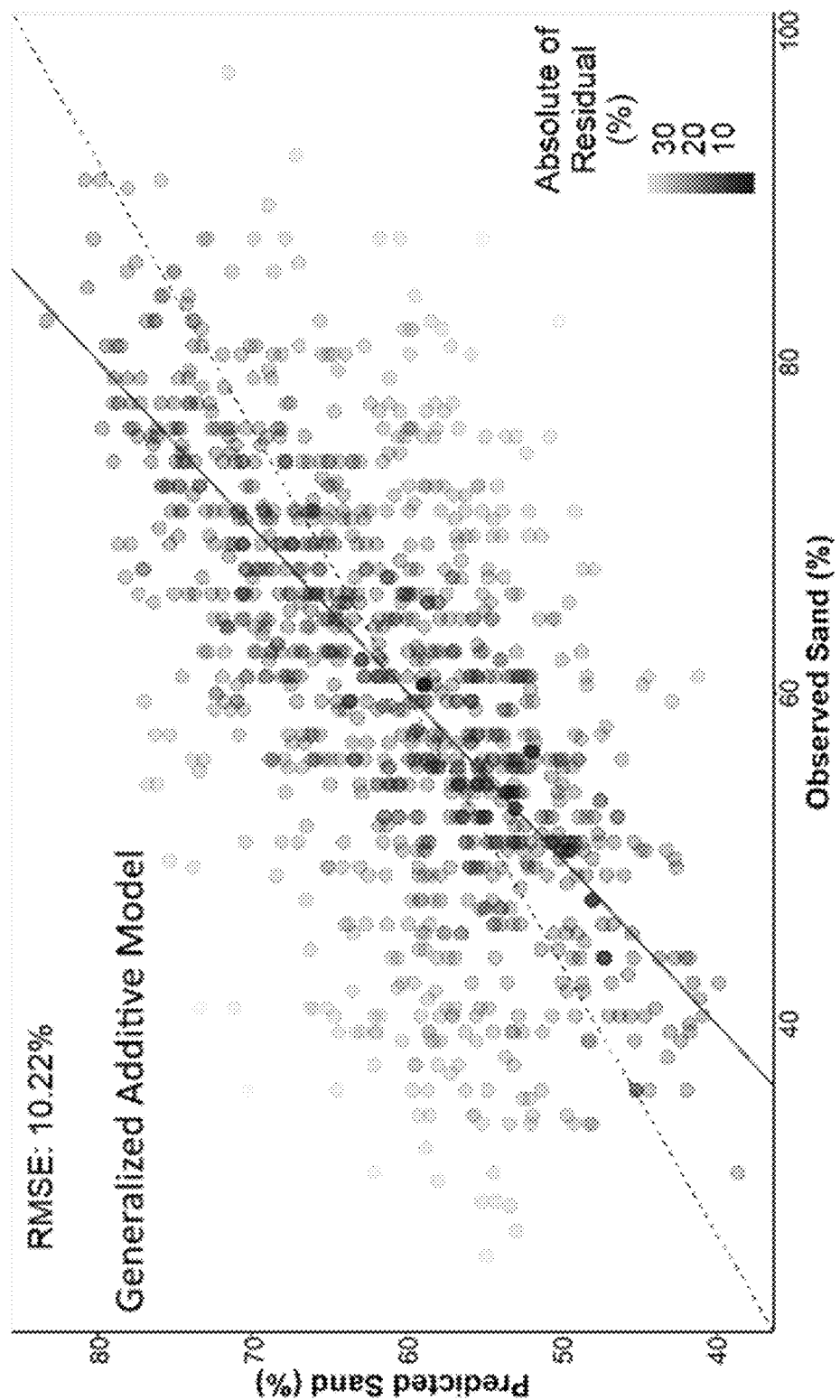
Figure 6D:
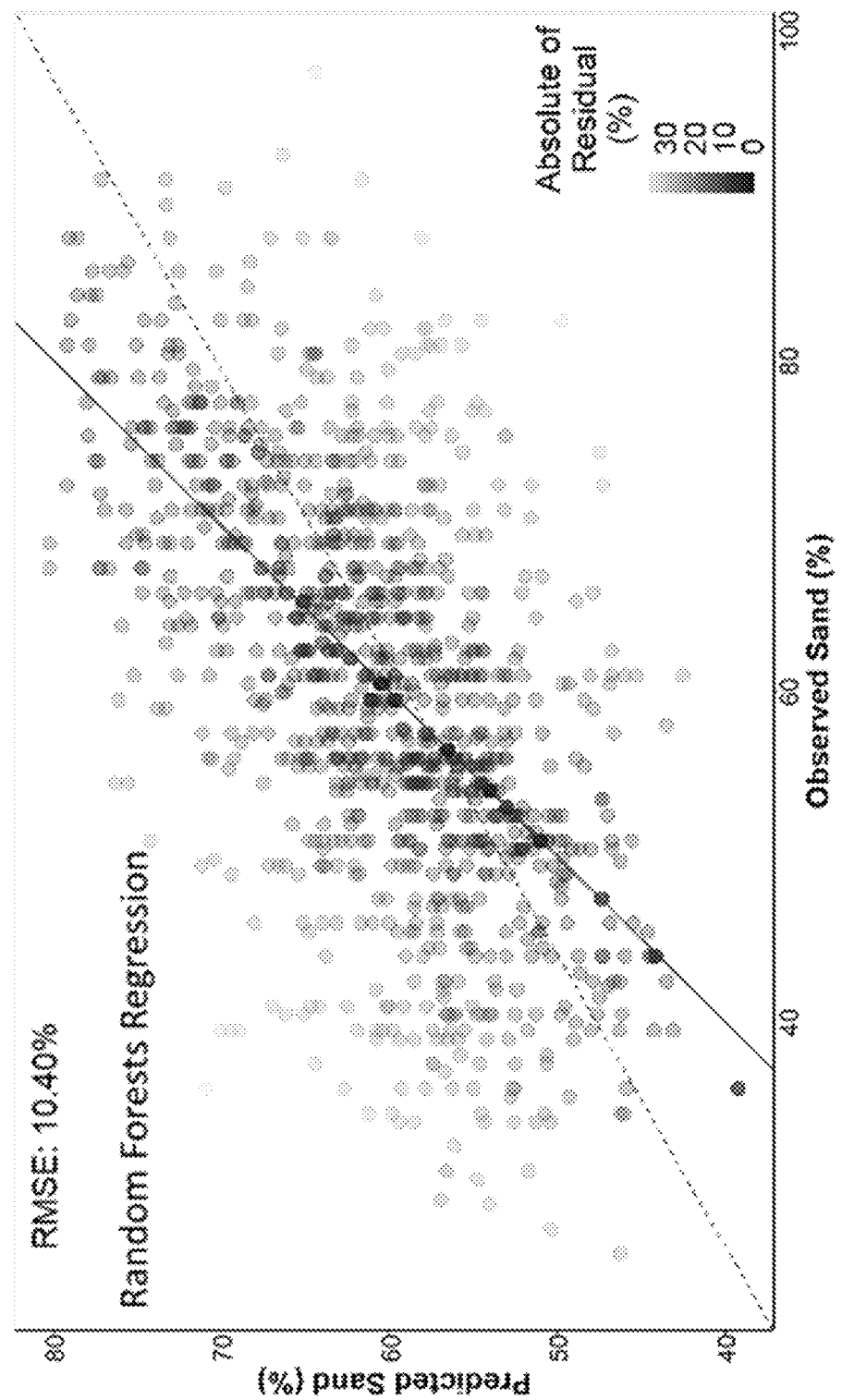

FIG. 6A shows the statistical precision of a digital soil map of percent sand produced using the integrative computational system process as compared to the precision generated in FIGS. 6B through 6D by three well-known predictive modeling techniques in the digital soil mapping domain, namely generalized linear model (GLM) (FIG. 6B), generalized additive model (GAM) (FIG. 6C), and random forests regression (RF) (FIG. 6D).

Figures 7A, 7B, 7C, 7D:
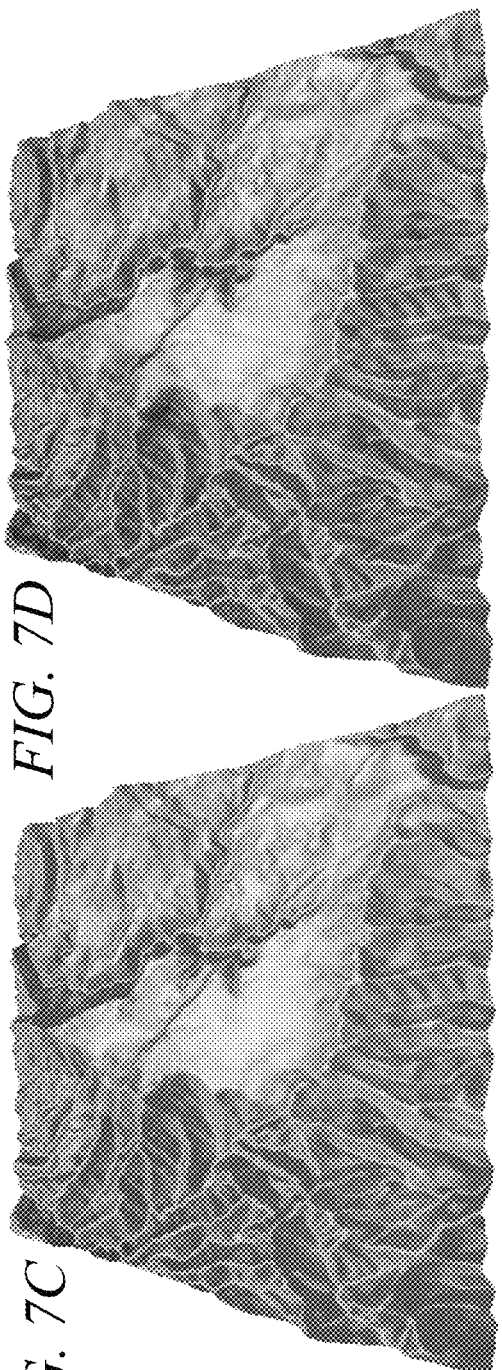
FIGS. 7A through 7D illustrate the subsets of the digital soil maps produced by the integrative computational soil mapping system and process (FIG. 7A), the generalized linear model (FIG. 7B), the generalized additive model (FIG. 7C), and the random forests regression (FIG. 7D).

As can be seen in FIG. 6A though 6D, the integrative computational system process resulted in the lowest root mean square error (RMSE) for the modeling of percent sand. The sand measurements were obtained from an intensive soil survey campaign in El Salvador, Central America. The total number of soil samples required for the integrative computational system and process and for the three predictive models was 863 and 1908, respectively. As illustrated, the integrative computational system and process only required 45% of the total number of soil samples used by the three predictive models, and the statistical precision, in terms of the RMSE, was superior. FIG. 7A thought 7D illustrate the subsets of the digital soil maps produced by the integrative computational soil mapping system and process (FIG. 7A), the generalized linear model (FIG. 7B), the generalized additive model (FIG. 7C), and the random forests regression (FIG. 7D).

The outputs of the integrative computational soil mapping process can support precision agriculture technologies and techniques by integrating the generated soil property maps into equipment guidance routines, the delineation of agricultural management zones, the variable rate application of fertilizers, and irrigation plans. Additionally, the outputs of the integrative computational soil mapping process can support integrative environmental resource management and sustainable ecosystem management by providing precise soil property estimates across space, which can be used to identify focal points for soil amendments and soil health concerns.

The integrative computational soil mapping process may be implemented in a computer system using hardware, software, firmware, tangible computer readable media having instructions stored thereon, or a combination thereof and may be implemented in one or more computer systems or other processing systems.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the inventions may be implemented in terms of this example computer system. After reading this description, it will become apparent to a person skilled in the relevant art how to implement one or more of the inventions using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device may be a special purpose or a general-purpose processor device or may be a cloud service wherein the processor device may reside in the cloud. As will be appreciated by persons skilled in the relevant art, processor device may also be a single processor in a multi-core/multiprocessor system, such system operating alone, or in a cluster of computing devices operating in a cluster or server farm. Processor device is connected to a communication infrastructure, for example, a bus, message queue, network, or multi-core message-passing scheme.

Computer system also includes a main memory, for example, random access memory (RAM), and may also include a secondary memory. Secondary memory may include, for example, a hard disk drive, or removable storage drive. Removable storage drive may include a floppy disk drive, a magnetic tape drive, an optical disk drive, a flash memory, a Universal Serial Bus (USB) drive, or the like. The removable storage drive reads from and/or writes to a removable storage unit in a well-known manner. Removable storage unit may include a floppy disk, magnetic tape, optical disk, etc. which is read by and written to by removable storage drive. As will be appreciated by persons skilled in the relevant art, removable storage unit includes a computer usable storage medium having stored therein computer software and/or data.

Computer system (optionally) includes a display interface (which can include input and output devices such as keyboards, mice, etc.) that forwards graphics, text, and other data from communication infrastructure (or from a frame buffer not shown) for display on display unit.

In alternative implementations, secondary memory may include other similar means for allowing computer programs or other instructions to be loaded into computer system. Such means may include, for example, a removable storage unit and an interface. Examples of such means may include a program cartridge and cartridge interface (such as that found in video game devices), a removable memory chip (such as an EPROM, PROM or Flash memory) and associated socket, and other removable storage units and interfaces which allow software and data to be transferred from the removable storage unit to computer system.

Computer system may also include a communication interface. Communication interface allows software and data to be transferred between computer system and external devices. Communication interface may include a modem, a network interface (such as an Ethernet card), a communication port, a PCMCIA slot and card, or the like. Software and data transferred via communication interface may be in the form of signals, which may be electronic, electromagnetic, optical, or other signals capable of being received by communication interface. These signals may be provided to communication interface via a communication path. Communication path carries signals, such as over a network in a distributed computing environment, for example, an intranet or the Internet, and may be implemented using wire or cable, fiber optics, a phone line, a cellular phone link, an RF link or other communication channels.

In this document, the terms "computer program medium" and "computer usable medium" are used to generally refer to media such as removable storage unit, removable storage unit, and a hard disk installed in hard disk drive. Computer program medium and computer usable medium may also refer to memories, such as main memory and secondary memory, which may be memory semiconductors (e.g. DRAMs, etc.) or cloud-computing.

Computer programs (also called computer control logic) are stored in main memory and/or secondary memory. Computer programs may also be received via communication interface. Such computer programs, when executed, enable computer system to implement the embodiments as discussed herein, including but not limited to machine learning and advanced artificial intelligence. In particular, the computer programs, when executed, enable processor device to implement the processes of the embodiments discussed here. Accordingly, such computer programs represent controllers of the computer system. Where the embodiments are implemented using software, the software may be stored in a computer program product and loaded into computer system using removable storage drive, interface, and hard disk drive, or communication interface.

Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Embodiments of the inventions also may be directed to computer program products comprising software stored on any computer useable medium. Such software, when executed in one or more data processing device, causes a data processing device(s) to operate as described herein. Embodiments of the inventions may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional elements.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the disclosure may be implemented by performing or completing manually, automatically, or a combination thereof, selected steps or tasks.

The term "process" may refer to manners, means, techniques and procedures for accomplishing a given task including, but not limited to, those manners, means, techniques and procedures either known to, or readily developed from known manners, means, techniques and procedures by practitioners of the art to which the invention belongs.

It should be noted that where reference is made herein to a process comprising two or more defined steps, the defined steps can be carried out in any order or simultaneously (except where context excludes that possibility), and the process can also include one or more other steps which are carried out before any of the defined steps, between two of the defined steps, or after all of the defined steps (except where context excludes that possibility).

Still further, additional aspects of the invention may be found in one or more appendices attached hereto and/or filed herewith, the disclosures of which are incorporated herein by reference as if fully set out at this point.

Thus, the invention is well adapted to carry out the objects and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A system for integrative computational soil mapping, the system comprising:
   a computer having a processor and a memory; and
   a software module stored in the memory, comprising executable instructions that when executed by the processor cause the processor to:
   receive electronic data representing soil information for an area of interest;
   automatically or semi-automatically generate environmental layers using spatial analysis related to a cluster category;
   automatically or semi-automatically perform selection of environmental layers;
   automatically or semi-automatically perform data dimensionality reduction for environmental layers in each cluster category;
   automatically or semi-automatically perform cluster analysis for each cluster category;
   automatically or semi-automatically generate generic soil-landscape classes from spatial interactions of clustering groups across the cluster categories;
   assign at least one soil property measurement to each generic soil-landscape class;
   generate a digital soil map of the soil property measurement for the area of interest;
   output the digital soil map to an electronic display for a user;
   group the environmental layers according to the cluster category;
   select the environmental layers that capture a predetermined amount of variability in environmental conditions of the area of interest;
   automatically or semi-automatically reduce the data dimensionality of environmental layers using the Self Organizing Map technique;
   automatically or semi-automatically recognize patterns of interaction between the selected environmental layers using cluster analysis;
   automatically determine an optimum number of the clustering groups in each cluster category;
   automatically predict and map a statistical distribution of the selected environmental layers for each clustering group using locally weighted polynomial regression;
   automatically generate a group-likelihood map that represents a likelihood of occurrence for each clustering group across the area of interest;
   automatically generate a generic soil-landscape class map using the generic soil-landscape class for each clustering group;
   automatically generate a single class-likelihood map representing the likelihood of occurrence for the generic soil-landscape class across the area of interest;
   assign a soil sample location on the class-likelihood map for each generic soil-landscape class where an utmost likelihood of occurrence for the generic soil-landscape class across the area of interest exists;
   assign the soil property measurement for each soil sample location on the class-likelihood map to each generic soil-landscape class;
   automatically perform spatial modeling of the soil property measurements;
   generate the digital soil map of the modeled soil property measurements; and
   output the digital soil map to the electronic display for the user.

2. The system of claim 1 wherein the cluster category comprises climate, vegetation, topography, parent material, or a combination thereof.

3. The system of claim 1 wherein the environmental layers comprise annual precipitation, mean annual temperature, elevation of the terrain, slope of the terrain, photosynthetic activity of vegetation, or a combination thereof.

4. The system of claim 2 wherein the cluster analysis determines naturally occurring clustering groups in the environmental layers for each clustering category.

5. The system of claim 2 wherein the system is configured to calculate the statistical distribution of the selected environmental layers for each clustering group using a kernel density estimate and empirical distribution function.

6. The system of claim 2 wherein the system is configured to average the group-likelihood maps for each generic soil-landscape class.

7. The system of claim 2 wherein the soil sample location comprises X-easting and Y-northing geographic coordinates.

8. The system of claim 1 wherein the soil property measurement comprises soil property measurements collected from the area of interest using the soil sample location or a user-supplied set of soil property measurements.

9. The system of claim 2 wherein the system is configured to automatically perform spatial modeling of the soil property measurements by:
   organize each class-likelihood map into a stack of matrices;
   for each element position in the stack of matrices, identify two elements with the utmost likelihood of occurrence for the generic soil-landscape classes across the area of interest;
   identify the corresponding generic soil-landscape classes for the two elements with the utmost likelihood of occurrence;
   identify the corresponding soil property measurements for the two identified generic soil-landscape classes; and
   calculate a weighted average of the identified soil property measurements using the utmost likelihood of occurrence of the generic soil-landscape classes as the assigned weight.

10. A process for integrative computational soil mapping, the process comprising the steps of:
    receiving electronic data representing soil information for an area of interest;

automatically or semi-automatically generating environmental layers using spatial analysis related to a cluster category;
automatically or semi-automatically performing cluster analysis for each cluster category;
automatically or semi-automatically generating generic soil-landscape classes from spatial interactions of clustering groups across the cluster categories;
assigning at least one soil property measurement to each generic soil-landscape class;
generating a digital soil map of the soil property measurement for the area of interest;
outputting the digital soil map to an electronic display for a user;
grouping the environmental layers according to the cluster category;
selecting the environmental layers that capture a predetermined amount of variability in environmental conditions of the area of interest;
automatically or semi-automatically performing data dimensionality reduction;
automatically or semi-automatically recognizing patterns of interaction between the selected environmental layers using cluster analysis;
automatically or semi-automatically performing selection of optimum number of clustering groups;
automatically predicting and mapping a statistical distribution of the selected environmental layers for each clustering group using predictive statistical regression;
automatically generating a group-likelihood map that represents a likelihood of occurrence for each clustering group across the area of interest;
automatically generating a generic soil-landscape class map using the generic soil-landscape class for each clustering group;
automatically generating a single class-likelihood map representing the likelihood of occurrence for the generic soil-landscape class across the area of interest;
assigning a soil sample location on the class-likelihood map for each generic soil-landscape class where an utmost likelihood of occurrence for the generic soil-landscape class across the area of interest exists;
assigning the soil property measurement for each soil sample location on the class-likelihood map to each generic soil-landscape class;
automatically performing spatial modeling of the soil property measurements;
generating the digital soil map of the modeled soil property measurements; and
outputting the digital soil map to the electronic display for the user.

11. The process of claim 10 wherein the cluster category comprises climate, vegetation, topography, parent material, or a combination thereof.

12. The process of claim 10 wherein the environmental layers comprise annual precipitation, mean annual temperature, elevation of the terrain, slope of the terrain, photosynthetic activity of vegetation, or a combination thereof.

13. The process of claim 10 wherein the cluster analysis determines naturally occurring clustering groups in the environmental layers for each cluster category.

14. The process of claim 10 further comprising the step of calculating the statistical distribution of the selected environmental layers for each clustering group using a kernel density estimate and empirical distribution function.

15. The process of claim 10 further comprising the step of averaging the group-likelihood maps for each generic soil-landscape class.

16. The process of claim 10 wherein the soil sample location comprises X-easting and Y-northing geographic coordinates.

17. The process of claim 10 wherein the soil property measurement property comprises soil property measurements collected from the area of interest using the soil sample location or a user-supplied set of soil property measurements.

18. The process of claim 10 further comprising the step of automatically performing spatial modeling of the soil property measurements by:
organizing each class-likelihood map into a stack of matrices;
for each element position in the stack of matrices, identifying two elements with the utmost likelihood of occurrence for the generic soil-landscape classes across the area of interest;
identifying the corresponding generic soil-landscape classes for the two elements with the utmost likelihood of occurrence;
identifying the corresponding soil property measurements for the two identified generic soil-landscape classes; and
calculate a weighted average of the identified soil property measurements using the utmost likelihood of occurrence of the generic soil-landscape classes as the assigned weight.

* * * * *